US011694245B2

(12) United States Patent
Leos

(10) Patent No.: US 11,694,245 B2
(45) Date of Patent: Jul. 4, 2023

(54) DEVICE AND SYSTEM FOR GENERATING VEHICLE REPAIR ESTIMATE REPORTS BASED ON PREDICTIVE ESTIMATING

(71) Applicant: Toyota Motor Sales, U.S.A., Inc., Torrance, CA (US)

(72) Inventor: Rick L. Leos, Diamond Bar, CA (US)

(73) Assignee: TOYOTA MOTOR SALES, U.S.A., INC., Torrance, CA (US)

( * ) Notice: Subject to any disclaimer, the term of this patent is extended or adjusted under 35 U.S.C. 154(b) by 125 days.

(21) Appl. No.: 16/025,911

(22) Filed: Jul. 2, 2018

(65) Prior Publication Data
US 2018/0315106 A1    Nov. 1, 2018

Related U.S. Application Data

(63) Continuation of application No. 13/842,944, filed on Mar. 15, 2013, now abandoned.

(51) Int. Cl.
*G06Q 30/0601* (2023.01)
*G06Q 10/20* (2023.01)

(52) U.S. Cl.
CPC ......... *G06Q 30/0611* (2013.01); *G06Q 10/20* (2013.01); *G06Q 30/0633* (2013.01)

(58) Field of Classification Search
CPC ............... G06Q 10/10; G06Q 30/0283; G06Q 30/0611; G06Q 10/20; G06Q 30/0633; G06Q 30/0601–0645

(Continued)

(56) References Cited

U.S. PATENT DOCUMENTS 5,765,143 A    6/1998  Sheldon
5,839,112 A *  11/1998 Schreitmueller ....... G06T 17/00
                                                              705/4

(Continued)

FOREIGN PATENT DOCUMENTS

CA          2593275        1/2009
WO    WO 2005/119538    12/2005

OTHER PUBLICATIONS

I-Car, "One-Time Use Fasteners," Dec. 11, 2006 https://www.i-car.com/pdf/advantage/online/2006/121106.pdf (Year: 2006).*

(Continued)

*Primary Examiner* — Allison G Wood
*Assistant Examiner* — Anna Mae Mitros
(74) *Attorney, Agent, or Firm* — Snell & Wilmer L.L.P.

(57) ABSTRACT

Consumer safety of repaired vehicles can be improved by providing systems and methods for generating vehicle repair estimate reports based on predictive estimating and transmitting these reports to clients. A master server serviced by a vehicle manufacturer generates a vehicle repair estimate report based on predictive estimating and transmits this report to a client via a web-based graphical user interface. Also, a master server serviced by a vehicle manufacturer generates a vehicle repair estimate report based on predictive estimating and transmits this report to a client via a vehicle repair claims management user interface. The vehicle repair estimate report based on predictive estimating may comprise repair packages and repair information relating to recommended replacement parts and quantities thereof, the part numbers for the suggested replacement parts, the price estimate for the suggested replacement parts, manufacturer-recommended repair instructions, and other relevant information.

20 Claims, 11 Drawing Sheets

(58) Field of Classification Search
USPC .................................. 705/26.4, 26.1–27.2
See application file for complete search history.

(56) References Cited

U.S. PATENT DOCUMENTS

| | | | |
|---|---|---|---|
| 6,633,851 B1 | 10/2003 | Engler | |
| 7,356,393 B1* | 4/2008 | Schlatre | G06Q 10/06 701/29.3 |
| 7,636,676 B1 | 12/2009 | Wolery et al. | |
| 8,577,736 B2 | 11/2013 | Swinson et al. | |
| 8,650,068 B2* | 2/2014 | Esser | G06Q 30/02 701/31.8 |
| 2002/0087578 A1* | 7/2002 | Vroman | G06Q 30/02 |
| 2003/0055812 A1* | 3/2003 | Williams | G06F 16/904 |
| 2003/0154111 A1 | 8/2003 | Dutra et al. | |
| 2005/0125261 A1* | 6/2005 | Adegan | G06Q 10/06 705/4 |
| 2005/0187834 A1* | 8/2005 | Painter | G06Q 30/06 705/28 |
| 2005/0256780 A1 | 11/2005 | Eldred | |
| 2006/0064393 A1* | 3/2006 | Orr | G06Q 30/0283 705/400 |
| 2007/0094296 A1 | 4/2007 | Peters, III | |
| 2008/0015954 A1 | 1/2008 | Huber | |
| 2008/0300962 A1 | 12/2008 | Cawton et al. | |
| 2009/0019008 A1 | 1/2009 | Moore et al. | |
| 2009/0150200 A1* | 6/2009 | Siessman | G06Q 10/0631 705/7.12 |
| 2009/0197228 A1 | 8/2009 | Afshar et al. | |
| 2009/0248545 A1* | 10/2009 | Robinson | G06Q 10/06 705/26.1 |
| 2010/0070333 A1 | 3/2010 | Musa | |
| 2010/0145831 A1 | 6/2010 | Esfandiari | |
| 2010/0191621 A1 | 7/2010 | Hogan | |
| 2011/0161206 A1 | 6/2011 | Mateer | |
| 2011/0258084 A1 | 10/2011 | Watts | |
| 2012/0084135 A1 | 4/2012 | Nissan | |
| 2012/0265648 A1 | 10/2012 | Jerome | |
| 2012/0300984 A1* | 11/2012 | Dann | G06T 19/006 382/103 |
| 2013/0009774 A1 | 1/2013 | Sabeta | |
| 2013/0204663 A1 | 8/2013 | Kahlow | |
| 2015/0112835 A1* | 4/2015 | Stewart | G06F 3/04842 705/26.8 |
| 2015/0262432 A1 | 9/2015 | Yturriaga-Trenor | |

OTHER PUBLICATIONS

John D. Lyman, Diagnosing Electrical Problems Post-Collision, BodyShop Business, Aug. 1, 2011 (Year: 2011).*
FCPEuro, "Volvo Front Strut Suspension Kit," Feb. 11, 2013; http://web.archive.org/web2013021161907/http://www.fcpeuro.com/products/volvo-front-strut-kit-struts-mounts-spring-seats-cem-vfsk3-oem.
I-Car, "One-Time use Fasteners," Dec. 11, 2006 https://www.i-car.com/pdf/advantage/online/2006/121106.pdf.
Car-Research XRM; 1 page; 2010.
Dealer Socket; 5 pages; 2013.
ADP Dealer Services; 1 page; 2013.
Dealer.com; 3 pages; 2013.
ELEAD CRM; 1 page; 2013.

* cited by examiner

Preliminary Estimate

Select area(s) for estimation:
Left Front Fender
Left Front Door Skin
Left Rear Door
Left Quarter Panel
[GO] — 91

Customer: 2012 CAR MODEL REAR BUMPER BODY FLOOR       Job Number:

| Line | Oper | Description | Part Number | Qty | Extended Price $ | Labor | Paint |
|---|---|---|---|---|---|---|---|
| | 92 | 93  94 | 95 | | 96 | 97 98 | 99 |
| REAR BUMPER | | | | | | | |
| 1 | | O/H bumper assy | | | | 1.2 | 3.0 |
| 2 | Repl | Bumper cover SE model | 5215906963 | 1 | 310.53 | Incl. | |
| 3 | | ⓘ NOTE: Component comes unprimed from OEM. Preparation is required | | | | | |
| 4 | | Add for Clear Coat | | | | | 1.2 |
| 5 | R&I | RT Side retainer | 5257506090 | | | 0.1 | |
| | | NOTE: TO ACCESS REPAIR AREA | | | | | |
| 6 | R&I | LT Side retainer | 5257606090 | | | 0.1 | |
| | | NOTE: TO ACCESS REPAIR AREA | | | | | |
| 7 | Repl | Energy absorber | 5261506060 | 1 | 44.08 | Incl. | |
| 8 | Repl | Reinf beam (ALU) | 5217106130 | 1 | 224.11 | Incl. | |
| | | ⓘ NOTE: PER TIS - DO NOT REPAIR - CRIB #161 | | | | | |
| 9 | Repl | Prep unprimed bumper | | 1 | | | 0.8 |
| | | 901 → ⓘ NOTE: Component comes unprimed from OEM. Preparation is required | | | | | |
| REAR LAMPS | | | | | | | |
| 10 | | | | | | | |
| 11 | R&I | RT Combo lamp assy | 8155006470 | | | 0.3 | |
| | | NOTE: TO ACCESS REPAIR AREA | | | | | |
| 12 | R&I | LT Combo lamp assy | 8155006470 | | | 0.3 | |
| | | NOTE: TO ACCESS REPAIR AREA | | | | | |
| 13 | Repl | RT Lens & housing seal | 8155406470 | 1 | 12.01 | | |
| | | NOTE: PER TIS NON-REUSABLE PART | | | | | |
| 14 | Repl | LT Lens & housing seal | 8155406470 | 1 | 12.01 | | |
| | | NOTE: PER TIS NON-REUSABLE PART | | | | | |
| TRUNK LID | | | | | | | |
| 15 | | | | | | | |
| 16 | R&I | Weatherstrip | 6446106110 | | | 0.3 | |
| | | NOTE: TO ACCESS REPAIR AREA | | | | | |

902 { lines 1–9 }
903 { lines 10–14 }
904 { lines 15–16 }

FIG. 9

| | | | | | | | |
|---|---|---|---|---|---|---|---|
| | SEATS & TRACKS | | | | | | |
| 50 | 51 | R&I | R&I rear seat complete | | | | 0.8 |
| | | | NOTE: REMOVE BEFORE WELDING TO PREVENT DAMAGE | | | | |
| | WHEELS | | | | | | |
| 52 | 53 | R&I | Spare R&I wheel | 4261106720 | m | | 0.1 |
| | | | NOTE: TO ACCESS REPAIR AREA | | | | |
| | EMISSION SYSTEM | | | | | | |
| 54 | 55 | R&I | Vapor canister 3.5 liter | 7774006180 | m | | 0.7 |
| | | | NOTE: TO ACCESS WELD AREA AND APPLY CORROSION PROTECTION, SEAM SEALER, AND REFINISH UNDERSIDE OF FLOOR PAN | | | | |
| | EXHAUST SYSTEM | | | | | | |
| 56 | 57 | R&I | R&I exhaust assy rearward of manifolds | | m | | 1.1 |
| | | | NOTE: TO ACCESS REPAIR AREA | | | | |
| 58 | | Repl | Intermed pipe gasket | 9008043033 | 1 | 4.65 | |
| | | | NOTE: PER TIS NON-REUSABLE PART | | | | |
| | ELECTRICAL | | | | | | |
| 59 | 60 | * R&I | Antenna Smart Key type 2 | 8999733020 | m | | 0.2 |
| | | | NOTE: LOCATED ON REAR BODY PANEL | | | | |
| | | | | SUBTOTALS | 3597.19 | 86.8 | 28.5 |

Estimate Totals — 100

| Category — 101 | Basis — 102 | Rate — 103 | Cost $ — 104 |
|---|---|---|---|
| 1001 → Parts | | | 3597.19 |
| 1002 → Body Labor | 86.8 hrs @ | $ 0.00/hr | 0.00 |
| 1003 → Paint Labor | 28.5 hrs @ | $ 0.00/hr | 0.00 |
| 1004 → Subtotal | | | 3597.19 |
| 1005 → Grand total | | | 3597.19 |

NOTES

Estimate Notes:  INSPECT ALL PARTS ONCE REMOVED TO VERIFY DAMAGE DID NOT OCCUR DURING REMOVAL PROCESS. IF PART IS DAMAGED UTILIZE PROPER REPAIR PROCEDURES OR REPLACE PART

FIG. 10

DEVICE AND SYSTEM FOR GENERATING VEHICLE REPAIR ESTIMATE REPORTS BASED ON PREDICTIVE ESTIMATING

CROSS REFERENCE TO RELATED APPLICATIONS

This application is a continuation of prior U.S. patent application Ser. No. 13/842,944, entitled "METHOD FOR GENERATING VEHICLE REPAIR ESTIMATE REPORTS BASED ON PREDICTIVE ESTIMATING," filed on Mar. 15, 2013, the entire contents and disclosure of this application is hereby incorporated by reference herein.

BACKGROUND

1. Field

The present invention relates generally to the vehicle repair industry and more particularly to the vehicle repair estimating industry.

2. Description of the Related Art

In the vehicle repair estimating industry, repair cost estimates for a damaged vehicle can vary widely from one vehicle repair shop to another. The varying repair cost estimates often stem from the lack of any vehicle manufacturer-approved standardized protocol for evaluating a damaged vehicle. Typically, to prepare a vehicle repair estimate, vehicle repair shops access one of three graphical user interfaces serviced by independent vehicle repair claims management companies: (1) Mitchell International, (2) Audatex, and (3) CCC One. Vehicle repair shops are accustomed to using Mitchell International, Audatex, or CCC One because their estimates are often approved by major insurance companies, thereby streamlining the estimate approval and reimbursement process. However, the estimating approach currently presented by Mitchell International, Audatex, or CCC One is deficient in facilitating vehicle manufacturer-approved repairs because it leaves the entirety of the repair estimating up to the discretion of each vehicle repair shop. In particular, these independent vehicle repair claims management companies only provide an à-la-carte listing of all vehicle parts associated with a particular vehicle. As a result, a vehicle repair shop has wide discretion in determining which vehicle parts will be replaced, the prices for these parts, whether genuine manufacturer-certified will be used, the repair methodology, among other considerations. Unfortunately, all too often, there are countless stories of faulty vehicle repairs. Thus, as most vehicle owners are well aware, the quality of a vehicle repair varies from one vehicle repair shop to another.

Faulty vehicle repairs stem from many sources, such as a vehicle repair shop's failure to thoroughly replace all necessary parts, failure to use genuine manufacturer-certified parts, or failure to properly repair the vehicle in accordance with vehicle manufacturer-recommended installation and repair instructions. By way of example, a vehicle manufacturer may designate certain vehicle parts as one-time use parts. A one-time use vehicle part must be replaced if it is altered or removed from the vehicle during the repair process, even if the part is undamaged. Unfortunately, it is common for a vehicle repair shop to re-use an undamaged one-time use vehicle part due to lack of knowledge that the part is a one-time use part. This problem is particularly acute for vehicle repair shops that service many different vehicle makes and models. The number of parts per vehicle, compounded by the hundreds of different vehicle makes and models, is simply overwhelming and not practical for a vehicle technician to commit to memory.

Alternatively, a vehicle repair shop's motivation to cut corners may result in faulty repairs. For example, a vehicle repair shop may charge for parts that were not even replaced, such as one-time use parts. Similarly, a vehicle repair shop may charge for parts that are manufacturer-certified but in reality, replace with parts that are not manufacturer-certified. Finally, a vehicle repair shop may cut corner on the actual repair process. In short, the opportunities for a vehicle repair shop to cut corners are voluminous and often escape the vehicle owner's notice until the vehicle breaks down due to the faulty repair-work.

Improperly repaired vehicles may present safety risks and generally require being re-repaired, resulting in increased costs, time, and inconvenience. Furthermore, improperly repaired vehicles may cause other vehicular problems not related to the initial malfunction that led to the initial repairs, resulting in increased safety risks, costs, time, and inconvenience. Improperly repaired vehicles not only present problems to the vehicle owner and the occupants thereof, but also to other individuals who may be exposed to the malfunctioned vehicle.

In light of the foregoing, there is an acute need for an alternative method of estimating vehicle repairs that will lead to more proper repairs to improve consumer safety stemming from faulty repairs.

Additionally, there is a need for providing manufacturer-recommended vehicle repair information to vehicle repair shops, insurance claim appraisers and adjusters, vehicle owners, and similar personnel in an efficient and effective manner.

SUMMARY OF THE INVENTION

The present invention addresses the foregoing needs of improving consumer safety by providing methods for generating a vehicle repair estimate report based on predictive estimating. This report includes information relating to manufacturer-recommended parts to be replaced, an identification of any one-time use parts, the part numbers for the suggested replacement parts, the price estimate for the suggested replacement parts, detailed manufacturer-approved repair instructions, among other relevant information.

The present invention provides an estimating approach known as predictive estimating. This predictive estimating approach is based on the concept that a more accurate vehicle repair estimate is realized when the vehicle repair estimator begins an estimate with a comprehensive listing of all the parts likely to be damaged. This comprehensive listing is prepared by the vehicle manufacturer to ensure that the proper expertise is utilized in evaluating a vehicle repair. With a comprehensive listing of all parts likely to be damaged, the vehicle repair estimator can then eliminate parts he or she deems unnecessary based on his or her expertise. Vehicle repair estimation based on elimination of parts ensures that the vehicle repair estimators do not miss key repair parts, particularly one-time use parts. By contrast, when an estimate begins essentially with a blank sheet, there is a higher likelihood that the vehicle repair estimator may miss key repair parts, thereby resulting in increased safety risks.

As previously discussed, the current graphical user interfaces provided by vehicle repair claims management companies such as Mitchell International, Audatex, and CCC One essentially provide estimators with a blank sheet approach whereby estimators, based on his or her expertise, select replacement parts from the à-la-carte listing of all vehicle parts associated with a particular vehicle.

The manufacturer-recommended vehicle repair information would include, but is not limited to, manufacturer-recommended parts to be replaced, an identification of any one-time use parts, the part numbers for the suggested replacement parts, the price estimate for the suggested replacement parts, and detailed manufacturer-approved repair instructions. The manufacturer-recommended vehicle repair information provides quality assurance that the suggested replacement parts and repair instructions are manufacturer-approved, thereby ensuring that the vehicle will be properly repaired. By way of example, the order in which certain vehicle parts are removed during the repair process is critical and this order may differ greatly from one vehicle to another. For instance, some vehicles require removing the restraint system prior to welding. Different vehicles require different methods in cutting the metal and different methods for preparing the paint job. Yet other vehicles have a particular method of applying the seam sealer. Thus, an added bonus of providing detailed manufacturer-recommended repair instructions is to educate vehicle repair shops as to the proper repair techniques.

The present invention provides systems and methods for generating vehicle repair estimate reports based on predictive estimating and transmitting these reports to clients via suitable graphical user interfaces. In one embodiment, a master server serviced by a vehicle manufacturer generates vehicle repair estimate reports based on predictive estimating and transmits these reports to clients via a web-based graphical user interface. In another embodiment, a master server serviced by a vehicle manufacturer generates vehicle repair estimate reports based on predictive estimating and transmits these reports to clients via a web-based graphical user interface serviced primarily by an independent vehicle repair claims management company. In either embodiment, the master server serviced is able to communicate in real-time with the clients. The vehicle repair estimate report based on predictive estimating may comprise repair packages and repair information relating to recommended replacement parts and quantities thereof, the part numbers for the suggested replacement parts, the price estimate for the suggested replacement parts, manufacturer-recommended repair instructions, identification of one-time use parts, and other relevant information. This report is customizable depending on the clients' needs and wishes.

BRIEF DESCRIPTION OF THE DRAWINGS

Other systems, methods, features and advantages of the present invention will be or will become apparent to one of ordinary skill in the art upon examination of the following figures and detailed description. It is intended that all such additional systems, methods, features and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIG. 9 is a screenshot of an exemplary graphical user interface further showing a portion of the vehicle repair estimate report based on predictive estimating shown in FIG. 8 according to an embodiment of the invention.

FIG. 10 is a screenshot of an exemplary graphical user interface further showing a portion of the vehicle repair estimate report based on predictive estimating shown in FIGS. 9-10 according to an embodiment of the invention.

DETAILED DESCRIPTION

Figure 1:
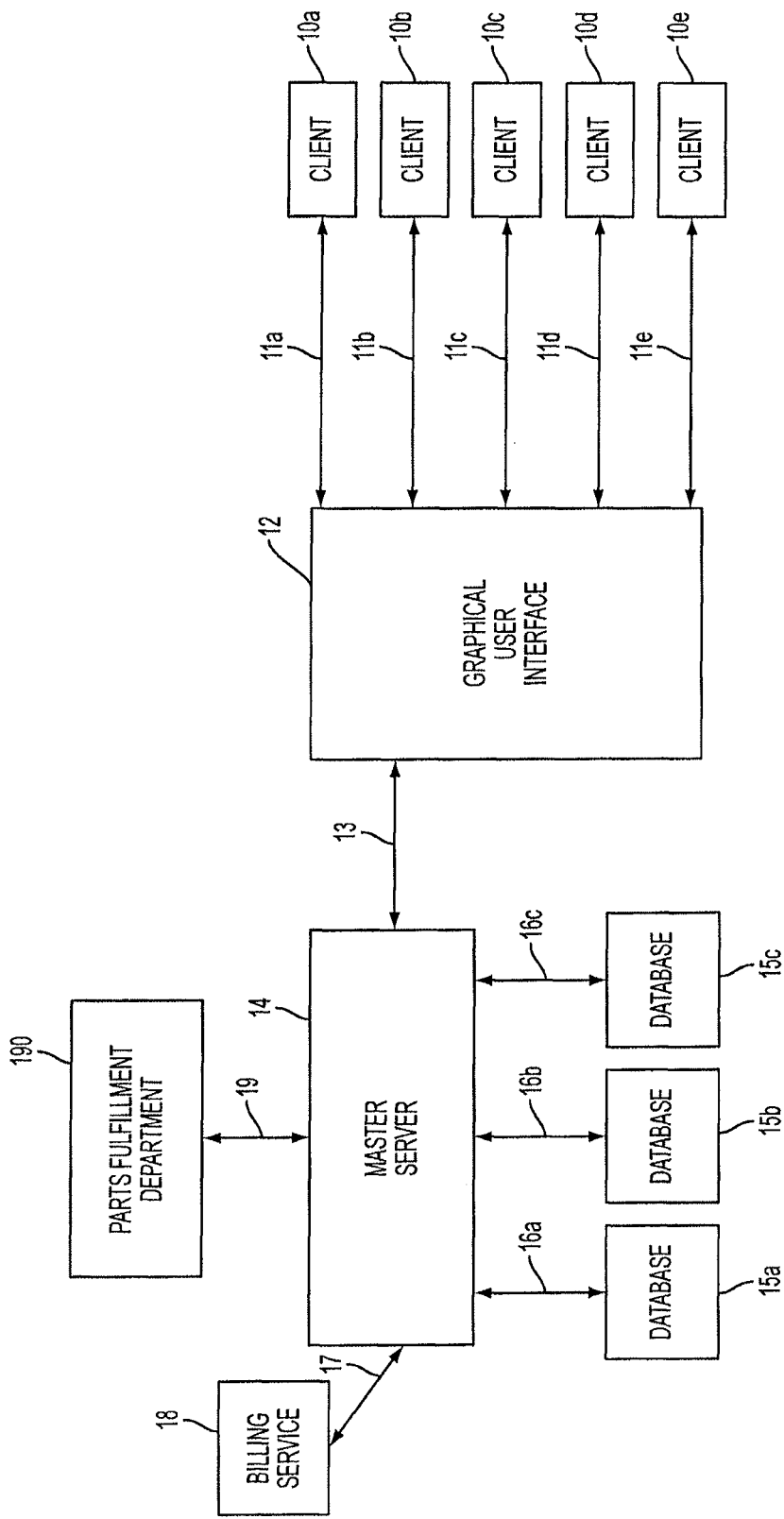
FIG. 1 is a block diagram showing an exemplary client-server system architecture for generating vehicle repair estimate reports based on predictive estimating, and transmitting these reports to clients via graphical user interfaces according to an embodiment of the invention.

FIG. 1 is a block diagram showing an exemplary client-server system architecture for generating vehicle repair estimate reports based on predictive estimating, and transmitting these reports to clients via graphical user interfaces. Clients 10a-10e communicate with master server 14 through a graphical user interface 12 by way of data transfer over suitable communication networks 13 and 11a-11e, respectively. It is understood by those skilled in the art that master server 14 has the capability to communicate with a single client, such as client 10a, or a plurality of clients, such as clients 10a-10e.

In one embodiment, client 10a comprises a desktop computer. For brevity, any discussion of client 10a is equally applicable to each of clients 10b-10e. In another embodiment, client 10a comprises a tablet computer. It is understood by those skilled in the art that each of clients 10a-10e can take many different forms, including but not limited to a desktop computer, laptop computer, tablet computer, cellular smart phone, or any computer with a suitable operating system. It is understood by those skilled in the art that a suitable operating system can take many different forms, including but not limited to Microsoft Windows, Mac Operating System, Google Android, iPhone Operating System, iPad Operating System, or any operating system capable of providing a graphical user interface. The users of clients 10a-10e may comprise vehicle repair shops, vehicle dealerships, insurance company claim appraisers and adjusters, vehicle owners, and any other similar personnel.

In one embodiment, suitable communication network 11a comprises the Internet. For brevity, any discussion of suitable communication network 11a is equally applicable to each of suitable communication networks 11b-11e, 13, 16a-16c, 17, and 19. In another embodiment, suitable communication network 11a comprises a wireless cellular network. It is understood by those skilled in the art that each of suitable communication networks 11a-11e, 13, 16a-16c, 17, and 19 may take many different forms, including but not limited to the Internet, wireless cellular network, local area network (LAN), wide area network (WAN), wired telephone network, wireless network, or any other network that supports data communication between the respective entities.

Master server 14 provides graphical user interface 12 to clients 10a-10e by way of data transfer over suitable communication networks 13 and 11a-11e, respectively. In one embodiment, graphical user interface 12 comprises a web-based graphical user interface, such as a website. In another embodiment, graphical user interface 12 comprises a tablet-based graphical user interface, such as an "App." It is understood by those skilled in the art that graphical user interface 12 can take many forms, including but not limited to a web-based graphical user interface such as a website, tablet-based graphical user interface such as an "App," cellular smart phone-based graphical user interface such as an "App," computer program, or any other suitable graphical user interface.

In one embodiment, master server 14 comprises a network server serviced by a vehicle manufacturer, and configured with the appropriate processing, memory and storage capacity to handle the load of servicing a plurality of clients 10a-10e. It is understood by those skilled in the art that master server 14 can take many different forms, including but not limited to a web server, file server, database server, proxy server, FTP server, and any other server configured with the appropriate processing, memory and storage capacity to handle the load of servicing a plurality of clients. As an example, more than one master server may be needed to provide additional processing, memory and storage capacity to handle the load of servicing a plurality of clients 10a-10e. Furthermore, master server 14 can be serviced by other entities, as it is not limited to the control and operation by a vehicle manufacturer.

Master server 14 communicates with a database 15a by way of data transfer over a suitable communication network 16a. Like master server 14, database 15a is serviced by the vehicle manufacturer. However, database 15a can be serviced by other entities, as it is not limited to the control and operation by a vehicle manufacturer. For brevity, any discussion of database 15a is equally applicable to each of databases 15b-15c. Likewise, any discussion of communication network 16a is equally applicable to each of communication networks 16b-16c. Master server 14 has the capability to communicate with a single database, such as database 15a, or with a plurality of database, such as databases 15a-15c. Accordingly, master server 14 can communicate with databases 15a-15c by way of data transfer over suitable communication networks 16a-16c, respectively. In one embodiment, suitable communication network 16a comprises a local area network (LAN). As previously discussed, it is understood by those skilled in the art that suitable communication networks 16a-16c may take many different forms, including but not limited to the Internet, wireless cellular network, local area network (LAN), wide area network (WAN), wired telephone network, wireless network, or any other network that supports data communication between the respective entities. Alternatively, databases 15a may reside within master server 14, thereby relinquishing the need for suitable communication networks 16a.

Databases 15a-15c store information used by master server 14 to generate vehicle repair estimate reports based on predictive estimating. Information stored in databases 15a-15c include but is not limited to information relating to vehicle identification, VIN, vehicle specifications, vehicle parts and part numbers, suggested prices for vehicle parts, suggested labor time for repair, one-time use parts, hazardous material parts, operation codes, paint codes, manufacturer-recommended installation instructions, manufacturer-recommended repair instructions, log-in credentials, and client account. The information can be stored in a single database, such as database 15a, or in a plurality of databases, such as databases 15a-15c. The information stored in databases 15a-15c may be continually updated as necessary. As detailed below, master server 14 generates vehicle repair estimate reports based on predictive estimating using information derived and processed from clients 10a-10e and databases 15a-15c.

The claimed methods for generating and transmitting vehicle repair estimate report based on predictive estimating can be provided as a subscription-based service. Also, the methods can provide clients with the option for purchasing the suggested replacement parts in the vehicle repair estimate report based on predictive estimating. Thus, the exemplary embodiment of FIG. 1 includes means for receiving and processing payment information. Therefore, master server 14 can communicate with billing service 18 by way of data transfer via suitable communication network 17. Billing service 18 processes the payment information. In one embodiment, billing service 18 is an in-house billing department. In another embodiment, billing service 18 is third-party billing service company. Further, master server 14 can communicate with parts fulfillment department 190 via suitable communication network 19. Parts fulfillment department 190 fulfills client 10a's order requests for the suggested replacement parts. In one embodiment, parts fulfillment department 190 is an in-house parts fulfillment department. In another embodiment, parts fulfillment department is an independent parts manufacturer or distributor.

Figure 2:
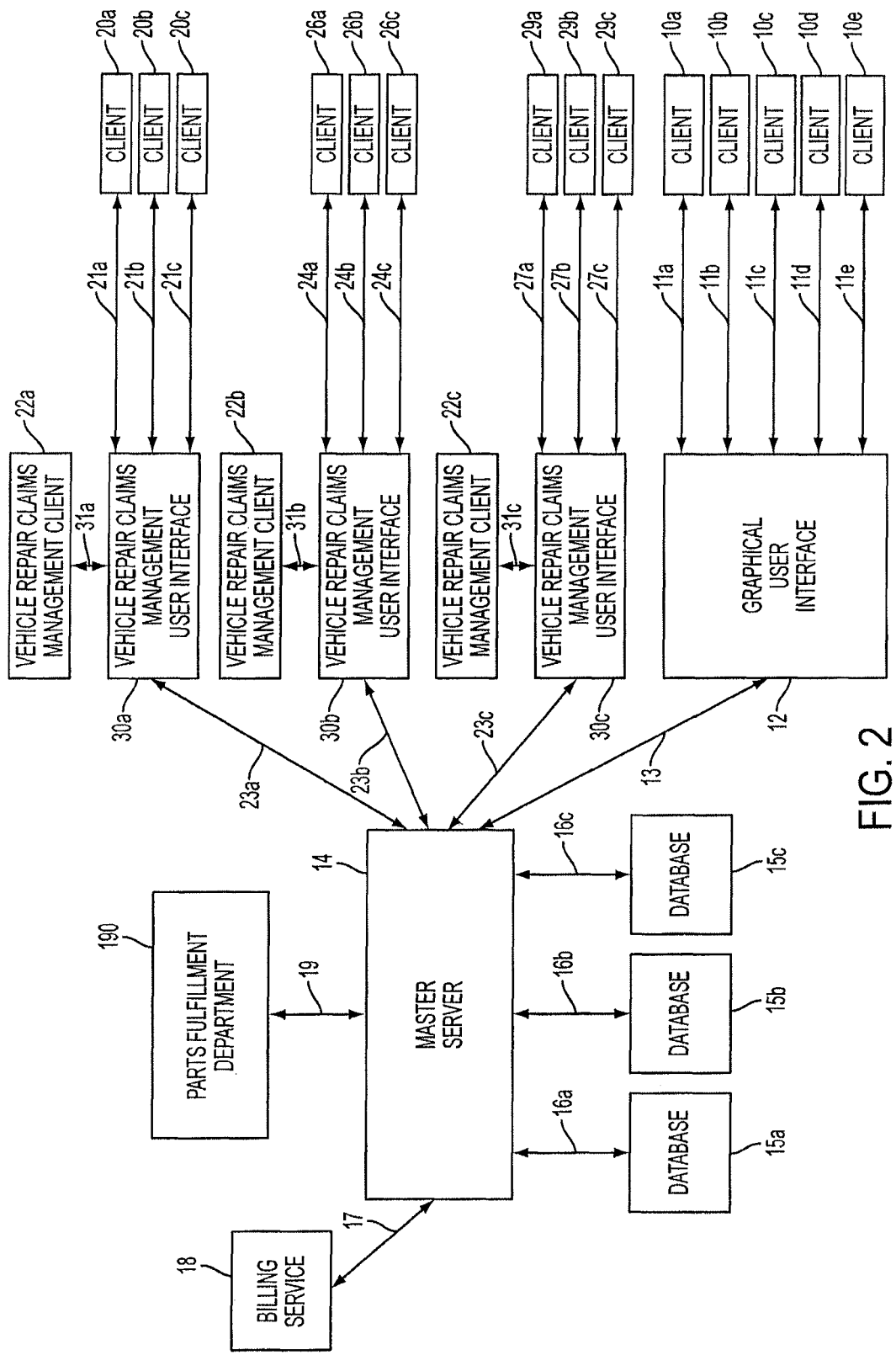
FIG. 2 is a block diagram showing another exemplary client-server system architecture for generating vehicle repair estimate reports based on predictive estimating, and transmitting these reports to clients via vehicle repair claims management user interfaces or via graphical user interfaces according to an embodiment of the invention.

FIG. 2 is a block diagram showing another exemplary client-server system architecture for generating vehicle repair estimate reports based on predictive estimating, and transmitting these reports to clients via vehicle repair claims management user interfaces or via graphical user interfaces. The reference numbers in FIG. 1 are re-used in FIG. 2 to indicate correspondence between referenced elements. The exemplary embodiment of FIG. 1 generates and transmits vehicle report estimate reports based on predictive estimating directly to clients 10a-10e via graphical user interface 12. The exemplary embodiment of FIG. 2 extends the exemplary embodiment of FIG. 1 to allow for the generation and transmission of vehicle repair reports based on predictive estimating to vehicle repair claims management clients 22a-22c and clients 20a-20c, 26a-26c, and 29a-29c, via vehicle repair claims management user interfaces 30a-30c. Clients 20a-20c, 26a-26c, and 29a-29c are similar to clients 10a-10e. The motivation for this extension is based on industry norms as to how vehicle repair shops typically prepare a vehicle repair estimate. Typically, to prepare a vehicle repair estimate, a vehicle repair shop accesses a graphical user interface serviced by one of the following three vehicle repair management companies: Mitchell International, Audatex, or CCC One. Through any of these three graphical user interfaces, an à-la-carte listing of all vehicle parts and price estimates associated with a particular vehicle are provided to the vehicle repair shop. Vehicle repair shops are accustomed to using one of these three graphical user interfaces because vehicle repair estimates prepared using any of these three graphical user interfaces are often approved by most major insurance companies, thereby streamlining the repair estimate approval and reimbursement process. Therefore, for purposes of convenience and industry norms, the exemplary embodiment of FIG. 2 extends this present invention to allow for the generation and transmission of vehicle repair reports based on predictive estimating to vehicle repair claims management clients 22a-22c and clients 20a-20c, 26a-26c, and 29a-29c, via vehicle repair claims management user interfaces 30a-30c.

As shown in FIG. 2, master server 14 communicates with a plurality of clients 10a-10e via graphical user interface 12 and a plurality of vehicle repair claims management clients 22a-22c and plurality of clients 20a-20c, 26a-26c, and 29a-29c, via vehicle repair claims management user interfaces 30a-30c, respectively. For brevity, the corresponding suitable communication networks are presumed. For example, the corresponding suitable communication networks associated with master server 14's communication with client 20a comprises suitable communication networks 23a and 21a. Master server 14 has the capability to communicate with only one client, such as client 10a or client 20a, or with only one vehicle repair claims management client, such as vehicle repair claims management client 22a, or a plurality of the foregoing. For brevity, any discussion of vehicle repair claims management client 22a is equally applicable to each of vehicle repair claims management clients 22b-22c. Likewise, any discussion of vehicle repair claims management user interface 30a is equally applicable to each of vehicle repair claims management user interface 30b-30c.

Vehicle repair claims management client 22a provides vehicle repair claims management user interface 30a by way of data transfer over suitable communication network 31a. In one embodiment, vehicle repair claims management user interface 30a comprises of a web-based graphical user interface, such as a website, serviced primarily by vehicle repair claims management client 22a. In another embodiment, vehicle repair claims management user interface 30a comprises of a tablet-based graphical user interface, such as an "App," serviced primarily by vehicle repair claims management client 22a. It is understood by those skilled in the art that vehicle repair claims management user interface 30a can take many forms, including but not limited to a web-based graphical user interface such as a website, tablet-based graphical user interface such as an "App," cellular smart phone-based graphical user interface such as an "App," computer program, or any other suitable graphical user interface.

Clients 20a-20c communicate with master server 14 through vehicle repair claims management user interface 30a by way of data transfer over suitable communication networks 21a-21c, and 23a, respectively, as shown in FIG. 2. Similarly, clients 26a-26c communicate with master server 14 through vehicle repair claims management user interface 30b by way of data transfer over suitable communication networks 24a-24c, and 23a, respectively, as shown in FIG. 2. Finally, clients 29a-29c communicate with master server 14 through vehicle repair claims management user interface 30c by way of data transfer over suitable communication networks 27a-27c, and 23c, respectively, as shown in FIG. 2.

As in the exemplary embodiment of FIG. 1, it is understood to one skilled in the art that each of suitable communication networks 21a-21c, 24a-24c, 27a-27c, 23 a-23c, and 31a-31c may take many different forms, including but not limited to the Internet, wireless cellular network, local area network (LAN), wide area network (WAN), wired telephone network, wireless network, or any other network that supports data communication between the respective entities.

As in exemplary embodiment of FIG. 1, it is understood to one skilled in the art that each of clients 20a-20c, 26a-26c, and 29a-29c can take many different forms, including but not limited to a desktop computer, laptop computer, tablet computer, cellular smart phone, or any computer with a suitable operating system. It is understood by those skilled in the art that a suitable operating system can take many different forms, including but not limited to Microsoft Windows, Mac Operating System, Google Android, iPhone Operating System, iPad Operating System, or any operating system capable of providing a graphical user interface. The users of clients 20a-20c, 26a-26c, and 29a-29c can be vehicle repair shops, vehicle dealerships, insurance company claim appraisers and adjusters, vehicle owners, or any other similar personnel.

As detailed below, master server 14 generates vehicle repair estimate reports based on predictive estimating using information derived and processed from vehicle repair claims management clients 22a-22c, clients 10a-10e, 20a-20c, 26a-26c, 29a-29c, and databases 15a-15c.

Figure 3:
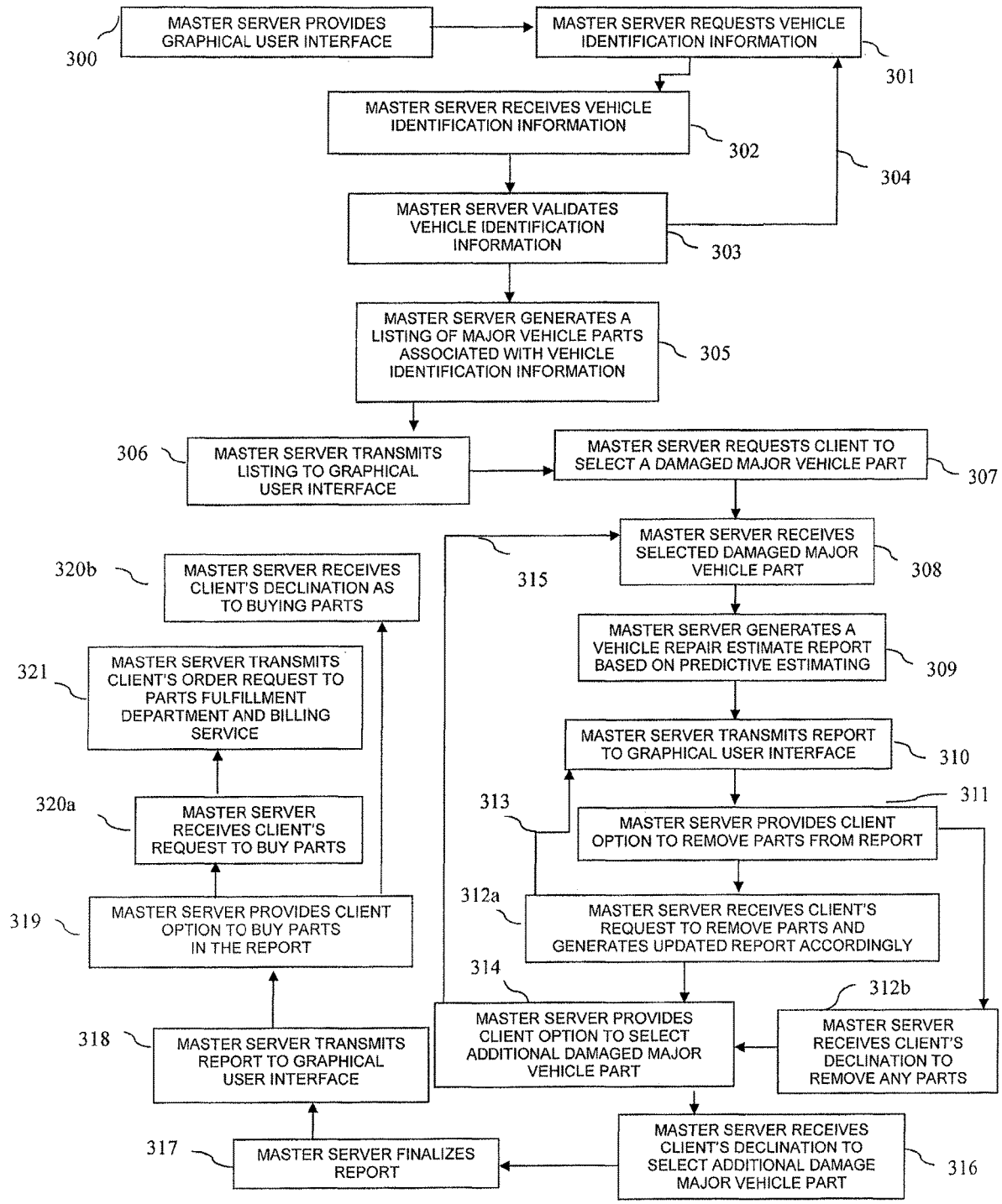
FIG. 3 is a flow chart of an exemplary method for generating vehicle repair estimate reports based on predictive estimating, and transmitting these reports to clients via graphical user interfaces according to an embodiment of the invention.

Referring now to FIG. 3, an exemplary method for generating vehicle repair estimate reports based on predictive estimating and delivering these reports to clients via graphical user interfaces are described in more detail. The reference numbers in FIGS. 1-2 are re-used in the discussion of this exemplary method of FIG. 3 to indicate correspondence between referenced elements. This exemplary method can be performed using either of the exemplary embodiments presented in FIGS. 1-2.

This method begins at step 300, with master server 14 providing graphical user interface 12 to clients 10a-10e by way of data transfer via suitable communication networks 13 and 11a-11e, respectively. Master server 14 services graphical user interface 12. Various screenshots of an exemplary graphical user interface are presented in FIGS. 5-11, and described in further detail below.

Figure 6:
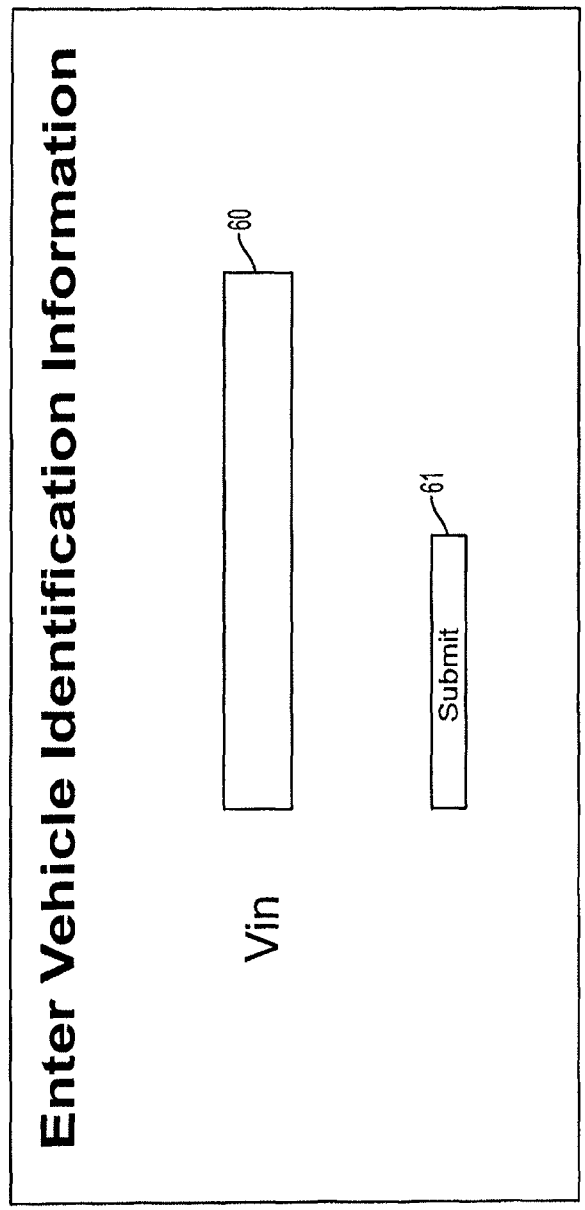
FIG. 6 is a screenshot of an exemplary graphical user interface requesting a client to provide vehicle identification information according to an embodiment of the invention.

At step 301, master server 14 requests client 10a to provide vehicle identification information through graphical user interface 12. For brevity, any discussion of client 10a is equally applicable to each of clients 10b-10c. Likewise, any discussion of suitable communication network 11a is equally applicable to each of suitable communication networks 11b-11e. Additionally, for purposes of brevity, the corresponding suitable communication networks are presumed. For example, the corresponding suitable communication networks associated with master server 14's communication with client 10a comprises suitable communication networks 13 and 11a, as shown in FIGS. 1-2. Typically, for a vehicle in the United States, the vehicle identification information comprises a vehicle identification number, commonly known to one skilled in the art as VIN. A VIN comprises a 17-digit alphanumeric code corresponding to a specific vehicle's year, make, model, trim, color, and manufacturer-installed options. To the extent that vehicles can be identified in a manner different from a VIN, the present invention is configurable to allow for the identification of vehicles based on these alternative means of identification. FIG. 6 presents a screenshot of an exemplary graphical user interface requesting a client for the vehicle's VIN.

At step 302, master server 14 receives the requested vehicle identification information from client 10a via graphical user interface 12 and suitable communication networks 11a and 13.

At step 303, master server 14 validates the provided vehicle identification information. Database 15a stores a database of vehicle identification information. For brevity, any discussion of database 15a is equally applicable to each of databases 15b-15c. Therefore, master server 14 validates the provided vehicle identification information by matching up the provided vehicle identification information with one stored in database 15a. If master server 14 finds a match, then step 305 commences.

However, if master server 14 does not find a match, then master server 14 requests client 10a to again provide vehicle identification information, as represented by step 304. Steps 301-304 are repeated until master server 14 validates the provided vehicle identification information.

At step 305, master server 14 generates a listing of major vehicle parts associated with the validated vehicle identification information by retrieving from database 15a major vehicle parts associated with the validated vehicle identification information. Master server 14 can customize at any time this database of major vehicle parts by adding, removing, or modifying any major vehicle part associated with a particular vehicle.

Figure 7:
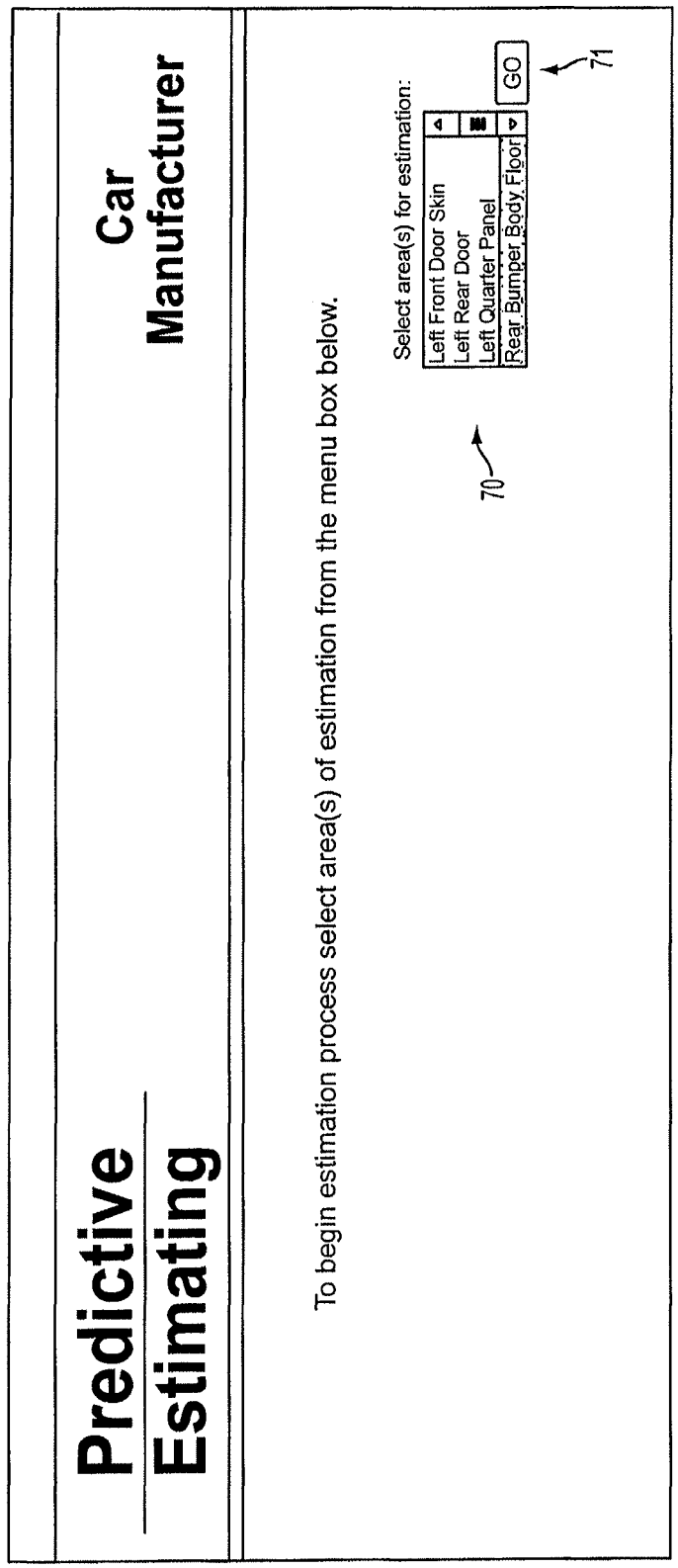
FIG. 7 is a screenshot of an exemplary graphical user interface requesting a client to select a damaged major vehicle part according to an embodiment of the invention.

At step 306, master server 14 transits the listing of major vehicle parts associated with the validated vehicle information to client 10a via graphical user interface 12. At step 307, master server 14 requests from client 10a to select via graphical user interface 12a damaged major vehicle part from this listing. FIG. 7 presents a screenshot of an exemplary graphical user interface requesting a client for the selection of a damaged major vehicle part using scroll-down window 70. As shown in FIG. 7, examples of a major vehicle part include, but are not limited to, left front door skin, left rear door, left quarter panel, and rear bumper body floor. As previously discussed, master server 14 can customize at any time its database of major vehicle parts by adding, removing, or modifying any major vehicle part associated with a particular vehicle.

At step 308, master server 14 receives from client 10a a selected damaged major vehicle part via graphical user interface 12.

At step 309, master server 14 generates a vehicle repair estimate report based on predictive estimating based on information derived and processed from databases 15a-15c and client 10a. FIGS. 8-11 presents various screenshots of an exemplary graphical user interface showing an exemplary vehicle repair estimate report based on predictive estimating. This predictive estimating approach is based on the concept that a more accurate vehicle repair estimate is realized when the vehicle repair estimator begins an estimate with a comprehensive listing of all the parts likely to be damaged. This comprehensive listing is prepared by the vehicle manufacturer to ensure that the proper expertise is utilized in evaluating a vehicle repair. With a comprehensive listing of all parts likely to be damaged, the vehicle repair estimator can then eliminate parts he or she deems unnecessary based on his or her expertise. Vehicle repair estimation based on elimination of parts ensures that the vehicle repair estimators do not miss key repair parts, particularly one-time use parts. By contrast, when an estimate begins essentially with a blank sheet, there is a higher likelihood that the vehicle repair estimator may miss key repair parts, thereby resulting in increased dangers of safety. As previously discussed, the current graphical user interfaces provided by vehicle repair claims management companies such as Mitchell International, Audatex, and CCC One essentially provide estimators with a blank sheet approach whereby estimators, based on his or her expertise, select replacement parts from the à-la-carte listing of all vehicle parts associated with a particular vehicle.

After receiving the selected damaged major vehicle part from client 10a, master server 14 retrieves from database 15a a listing of all parts that a vehicle manufacturer recommends replacing based on the selected damaged major vehicle part. This listing is pre-set by the vehicle manufacturer based on the selected damaged major vehicle part. Typically, the vehicle manufacturer utilizes its expertise to determine which parts are likely damaged based on the selected damaged major vehicle part and accordingly, will include the likely damaged vehicle parts in this pre-set listing. However, master server 14 can customize at any time this pre-set listing by adding, removing, or modifying any vehicle parts to this listing.

After master server 14 retrieves the vehicle manufacturer-recommended listing of parts to replace, master server 14 then retrieves from databases 15a-15c all relevant vehicle repair information associated with these parts. This step requires master server 14 to process a large volume of information because various pieces of relevant vehicle repair information pertaining to each recommended replacement part may be stored in different databases. The relevant vehicle repair information may comprise information relating to vehicle identification, VIN, vehicle specifications, vehicle parts and part numbers, suggested prices for vehicle parts, suggested labor time for repair, one-time use parts, hazardous materials parts, operation codes, paint codes, manufacturer-recommended installation instructions, and manufacturer-recommended repair instructions. This large volume of information stems from the simple fact that there are hundreds of different vehicle models, compounded by the hundreds of different parts per vehicle model, hence there could easily be thousands if not millions of vehicle parts for master server 14 to process. In processing this large volume of information, master server 14 identifies and extracts from databases 15a-15c various pieces of information applicable to each recommended replacement part.

Figure 8:
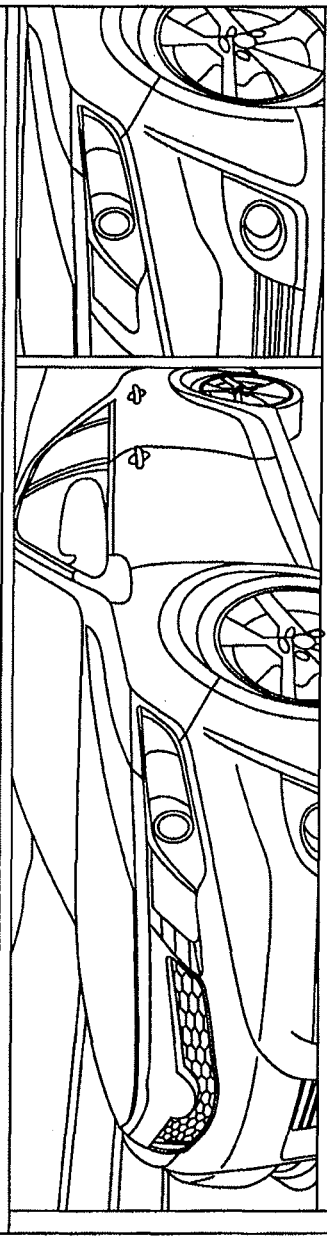
FIG. 8 is a screenshot of an exemplary graphical user interface showing a portion of a vehicle repair estimate report based on predictive estimating according to an embodiment of the invention.

After extracting from databases 15a-15c the various pieces of information applicable to each recommended replacement part, master server 14 then repackages all this information into different repair packages. These repair packages are essentially subcategories conveniently grouped according to the type and/or location of the damage. As shown in FIGS. 9-10, some examples of subcategories include rear bumper 902, rear lamps 903, trunk lid 904, seats and tracks 105, wheels 106, emission system 107, exhaust system 108, and electrical 109. Master server 14 then generates a listing of the vehicle parts within each subcategory, as shown in FIGS. 9-10. As shown in FIGS. 9-10, the vehicle repair estimate report based on predictive estimating presents each vehicle part with information relating to an operation code, description of part, part number, quantity, extended price, labor code, paint code, one-time use part, hazardous material part, manufacturer-recommended installation and repair instructions. Master server 14 can customize at any time this report to add, delete, or modify any of the foregoing vehicle repair information. As shown in FIG. 8, the vehicle repair estimate report based on predictive estimating also includes vehicle identification and specification information.

At step 310, master server 14 transmits the vehicle repair estimate report based on predictive estimating to graphical user interface 12 via suitable communication network 13. At step 311, master server 14 provides client 10a with an option to remove any vehicle parts listed on this report based on client 10a's discretion.

At step 312a, master server 14 receives client 10a's request to remove at least one part from the report and generates an updated vehicle report estimate report accordingly. At step 313, master server 14 transmits the updated vehicle repair report to client 10a via graphical user interface 12. Steps 310-313 can be repeated until master server 14 receives client 10a's declination as to removing any vehicle parts from the report. The vehicle repair estimate report based on predictive estimating can be customized in many different ways depending on the clients' needs and wishes. Thus, a client is not limited to only the option of removing at least one specific part from the report.

At step 312b, master server 14 receives client 10a's declination as to removing any vehicle parts from the report. At step 314, master server 14 provides client 10a with an option to select an additional damaged major vehicle part to include in the vehicle repair estimate report based on predictive estimating. At step 315, if master server 14 receives client 10a's request to include an additional damaged major vehicle part in the report, then steps 308-314 are repeatedly until master server 14 receives client 10a's declination as to the selection of any other additional damaged major vehicle part at step 316.

At step 317, master server 14 finalizes the vehicle repair estimate report based on predictive estimating. At step 318, master server 14 transmits the finalized vehicle repair estimate report based on predictive estimating to client 10a via graphical user interface 12.

At step 319, master server 14 provides client 10a with an option to purchase any vehicle part listed in the finalized vehicle repair estimate report based on predictive estimating.

At step 320a, master server 14 receives client 10a's order request to purchase at least one vehicle part listed in the finalized vehicle repair estimate report based on predictive estimating. Alternatively, at step 320b, master server 14 receives client 10a's declination to purchase any parts listed in the finalized vehicle repair estimate report based on predictive estimating.

At step 321, master server 14 transmits client 10a's order request to the parts fulfillment department 190 and to billing service 18 for fulfillment of the order request.

Figure 4:
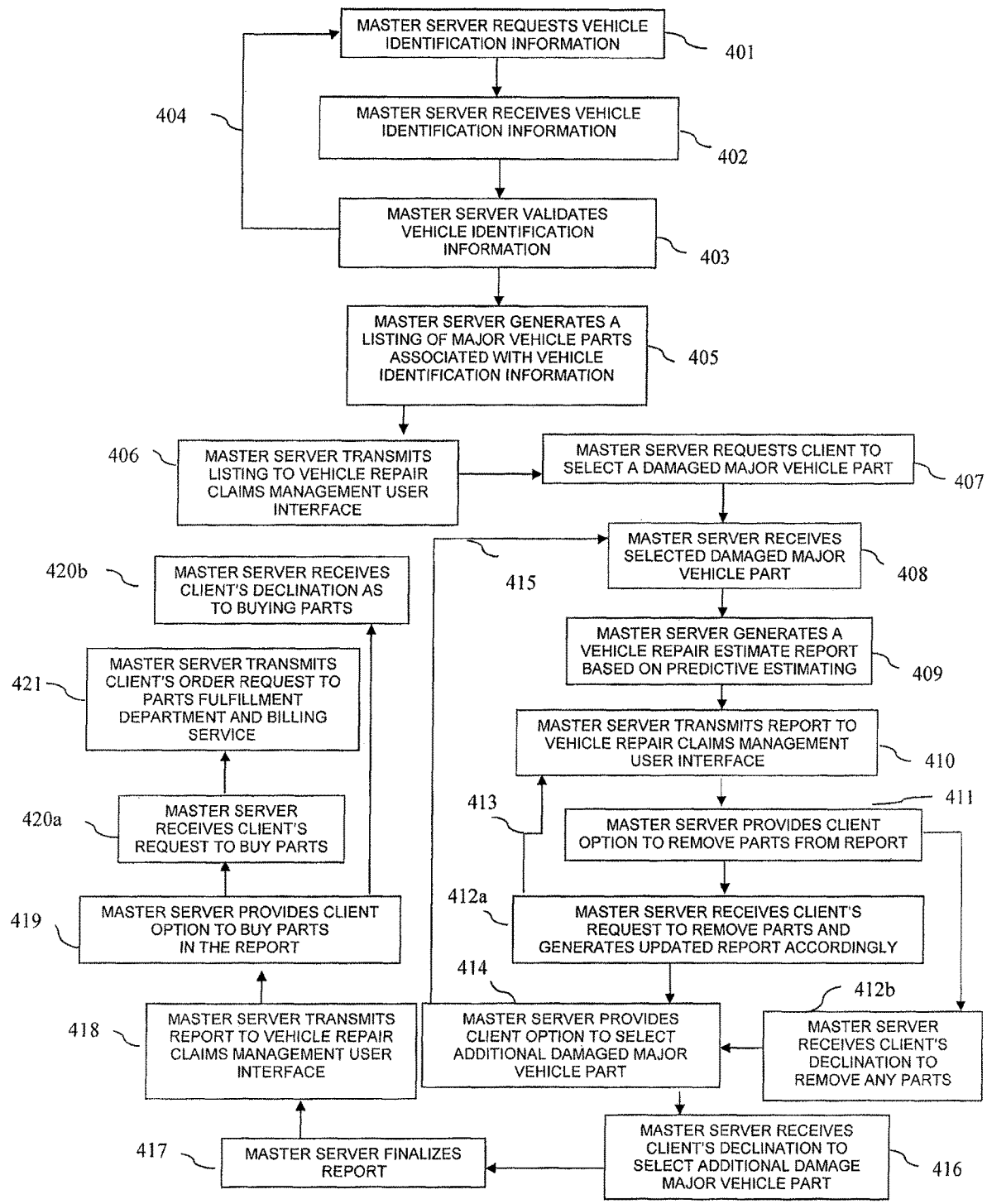
FIG. 4 is a flow chart of an exemplary method for generating vehicle repair estimate reports based on predictive estimating, and transmitting these reports to clients via vehicle repair claims management user interfaces or via graphical user interfaces according to an embodiment of the invention.

FIG. 4 is a flow chart of an exemplary method for generating vehicle repair estimate reports based on predictive estimating, and transmitting these reports to clients via vehicle repair claims management user interfaces or via graphical user interfaces. The reference numbers in FIGS. 1-2 are re-used in the discussion of this exemplary method of FIG. 4 to indicate correspondence between referenced elements. This exemplary method of FIG. 4 operates in a similar manner as the exemplary method of FIG. 3. Thus, the last two numbers in the referenced items in FIG. 4 correspond to a similar step in FIG. 3. For example, step 301 in FIG. 3 is similar to step 401 in FIG. 4. Therefore, any previous discussion of step 301 in FIG. 3 is likewise applicable to step 401 in FIG. 4. This exemplary method of FIG. 4 can be performed using the exemplary embodiment presented in FIG. 2. As previously discussed in FIG. 2, any discussion of vehicle repair claims management user interface 30a is equally applicable to each of vehicle repair claims management user interfaces 30b-30c. Likewise, any discussion of client 20a is equally applicable to each of clients 20b-20c, 26a-26c, and 29a-29c.

In one embodiment, master server 14 communicates with vehicle repair claims management user interface 30a using an application programming interface, commonly referred by one skilled in the art as API. In another embodiment, master server 14 communicates with vehicle repair claims management user interface 30a using SIM Application Toolkit, commonly referred by one skilled in the art as STK. It is understood to one skilled in the art that master server 14 can communicate with vehicle repair claims management user interface 30a using API, STK, or any other protocol allowing for real-time interaction between the respective entities.

The exemplary method of FIG. 4 begins at step 401. At step 401, master server 14 requests client 20a to provide vehicle identification information through vehicle repair claims management user interface 30a. For brevity, any discussion of client 20a is equally applicable to each of clients 20b-20c, 26a-26c, and 29a-29c. Likewise, any discussion of suitable communication network 21a is equally applicable to each of suitable communication networks 21b-21c, 24a-24c, and 27a-27c. Additionally, for purposes of brevity, the corresponding suitable communication networks are presumed. For example, the corresponding suitable communication networks associated with master server 14's communication with client 20a comprises suitable communication networks 23a and 21a, as shown in FIG. 2. Typically, for a vehicle in the United States, the vehicle identification information comprises a vehicle identification number, commonly known to one skilled in the art as VIN. A VIN comprises a 17-digit alphanumeric code corresponding to a specific vehicle's year, make, model, trim, color, and manufacturer-installed options. To the extent that vehicles can be identified in a manner different from a VIN, the present invention is configurable to allow for the identification of vehicles based on these alternative means of identification. FIG. 6 presents a screenshot of an exemplary graphical user interface requesting a client for the vehicle's VIN.

At step 402, master server 14 receives the requested vehicle identification information from client 20a via vehicle repair claims management user interface 30a and suitable communication networks 21a and 23a. At step 403, master server 14 validates the provided vehicle identification information. Database 15a stores a database of vehicle identification information. For brevity, any discussion of database 15a is equally applicable to each of databases 15b-15c. Therefore, master server 14 validates the provided vehicle identification information by matching up the provided vehicle identification information with one stored in database 15a. If master server 14 finds a match, then step 405 commences.

However, if master server 14 does not find a match, then master server 14 requests client 20a to again provide vehicle identification information, as represented by step 404. Steps 401-404 are repeated until master server 14 validates the provided vehicle identification information.

At step 405, master server 14 generates a listing of major vehicle parts associated with the validated vehicle identification information by retrieving from database 15*a* major vehicle parts associated with the validated vehicle identification information. Master server 14 can customize at any time this database of major vehicle parts by adding, removing, or modifying any major vehicle part associated with a particular vehicle, if desired.

At step 406, master server 14 transits the listing of major vehicle parts associated with the validated vehicle information to client 20*a* via vehicle repair claims management user interface 30*a*. At step 407, master server 14 requests from client 20*a* to select via vehicle repair claims management user interface 30*a* a damaged major vehicle part from this listing. FIG. 7 presents a screenshot of an exemplary graphical user interface requesting a client for the selection of a damaged major vehicle part using scroll-down window 70. As shown in FIG. 7, examples of a major vehicle part include, but are not limited to, left front door skin, left rear door, left quarter panel, and rear bumper body floor. As previously discussed, master server 14 can customize at any time its database of major vehicle parts by adding, removing, or modifying any major vehicle part associated with a particular vehicle, if desired.

At step 408, master server 14 receives from client 20*a* a selected damaged major vehicle part via vehicle repair claims management user interface 30*a*.

At step 409, master server 14 generates a vehicle repair estimate report based on predictive estimating based on information derived and processed from databases 15*a*-15*c* and client 20*a*. FIGS. 8-11 presents various screenshots of an exemplary graphical user interface showing an exemplary vehicle repair estimate report based on predictive estimating. After receiving the selected damaged major vehicle part from client 20*a*, master server 14 retrieves from database 15*a* a listing of all parts that a vehicle manufacturer recommends replacing based on the selected damaged major vehicle part. This listing is pre-set by the vehicle manufacturer based on the selected damaged major vehicle part. Typically, the vehicle manufacturer utilizes its expertise to determine which parts are likely damaged based on the selected damaged major vehicle part and accordingly, will include the likely damaged vehicle parts in this pre-set listing. However, master server 14 can customize at any time this pre-set listing by adding, removing, or modifying any vehicle parts to this listing.

After master server 14 retrieves the vehicle manufacturer-recommended listing of parts to replace, master server 14 then retrieves from databases 15*a*-15*c* all relevant vehicle repair information associated with these parts. This step requires master server 14 to process a large volume of information because various pieces of relevant vehicle repair information pertaining to each recommended replacement part may be stored in different databases. The relevant vehicle repair information may comprise information relating to vehicle identification, VIN, vehicle specifications, vehicle parts and part numbers, suggested prices for vehicle parts, suggested labor time for repair, one-time use parts, hazardous materials parts, operation codes, paint codes, manufacturer-recommended installation instructions, and manufacturer-recommended repair instructions. This large volume of information stems from the simple fact that there are hundreds of different vehicle models, compounded by the hundreds of different parts per vehicle model, hence there could easily be thousands if not millions of vehicle parts for master server 14 to process. In processing this large volume of information, master server 14 identifies and extracts from databases 15*a*-15*c* various pieces of information applicable to each recommended replacement part.

After extracting from databases 15*a*-15*c* the various pieces of information applicable to each recommended replacement part, master server 14 then repackages all this information into different repair packages. These repair packages are essentially subcategories conveniently grouped according to the type and/or location of the damage. As shown in FIGS. 9-10, some examples of subcategories include rear bumper 902, rear lamps 903, trunk lid 904, seats and tracks 105, wheels 106, emission system 107, exhaust system 108, and electrical 109. Master server 14 then generates a listing of the vehicle parts within each subcategory, as shown in FIGS. 9-10. As shown in FIGS. 9-10, the vehicle repair estimate report based on predictive estimating presents each vehicle part with information relating to an operation code, description of part, part number, quantity, extended price, labor code, paint code, one-time use part, hazardous material part, manufacturer-recommended installation and repair instructions. Master server 14 can customize this report to add, delete, or modify any of the foregoing vehicle repair information. As shown in FIG. 8, the vehicle repair estimate report based on predictive estimating also includes vehicle identification and specification information.

At step 410, master server 14 transmits the vehicle repair estimate report based on predictive estimating to vehicle repair claims management user interface 30*a* via suitable communication network 23*a*. At step 411, master server 14 provides client 20*a* with an option to remove any vehicle parts listed on this report based on client 20*a*'s discretion.

At step 412*a*, master server 14 receives client 20*a*'s request to remove at least one part from the report and generates an updated vehicle report estimate report accordingly. At step 413, master server 14 transmits the updated vehicle repair report to client 20*a* via vehicle repair claims management user interface 30*a*. Steps 410-413 can be repeated until master server 14 receives client 20*a*'s declination as to removing any vehicle parts from the report. The vehicle repair estimate report based on predictive estimating can be customized in many different ways depending on the clients' needs and wishes. Thus, a client is not limited to only the option of removing at least one specific part from the report.

At step 412*b*, master server 14 receives client 20*a*'s declination as to removing any vehicle parts from the report. At step 414, master server 14 provides client 20*a* with an option to select an additional damaged major vehicle part to include in the vehicle repair estimate report based on predictive estimating. At step 415, if master server 14 receives client 20*a*'s request to include an additional damaged major vehicle part in the report, then steps 408-414 are repeatedly until master server 14 receives client 20*a*'s declination as to the selection of any other additional damaged major vehicle part at step 416.

At step 417, master server 14 finalizes the vehicle repair estimate report based on predictive estimating. At step 418, master server 14 transmits the finalized vehicle repair estimate report based on predictive estimating to client 20*a* via vehicle repair claims management user interface 30*a*.

At step 419, master server 14 provides client 20*a* with an option to purchase any vehicle part listed in the finalized vehicle repair estimate report based on predictive estimating.

At step 420*a*, master server 14 receives client 20*a*'s order request to purchase at least one vehicle part listed in the finalized vehicle repair estimate report based on predictive estimating. Alternatively, at step 420*b*, master server 14 receives client 20*a*'s declination to purchase any parts listed in the finalized vehicle repair estimate report based on predictive estimating.

At step 421, master server 14 transmits client 20*a*'s order request to the parts fulfillment department 190 and to billing service 18 for fulfillment of the order request.

Figure 5:
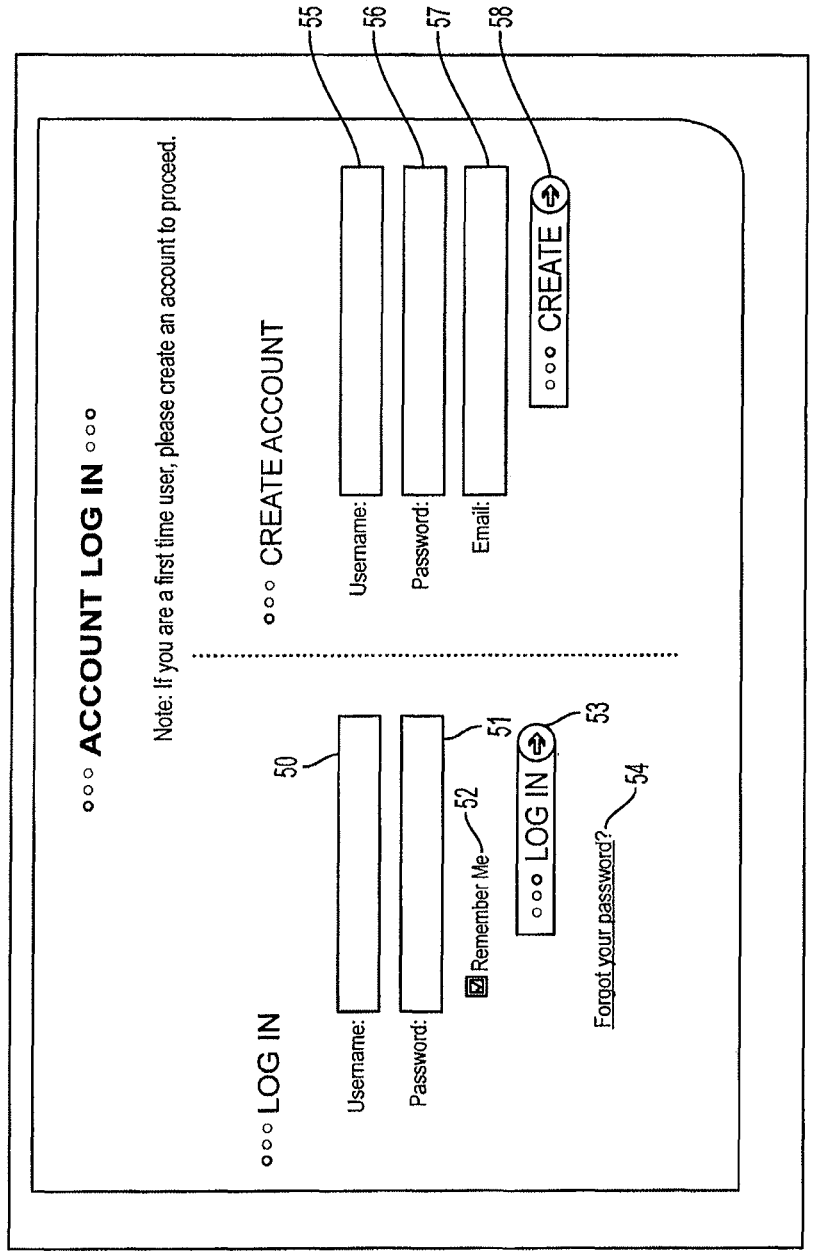
FIG. 5 is a screenshot of an exemplary graphical user interface requesting a client to provide log-in credentials or in the alternative, new account information for creation of an account according to an embodiment of the invention.

FIG. 5 is a screenshot of an exemplary graphical user interface requesting a client to provide log-in credentials or in the alternative, new account information for creation of an account. Window 50 requests the client to provide a log-in username and window 51 request the client to provide a corresponding password. "Remember Me" option box 52 provides the client with an option of remembering the client's log-in username for future visits. After inputting the client's log-in username and corresponding password, the client will click on "Log in" button 53 to proceed to a graphical user interface for inputting vehicle identification information, as shown in FIG. 6.

Furthermore, in the alternative, the exemplary graphical user interface of FIG. 5 requests a new client to create an account. Window 55 requests a new client to provide a desired log-in username, window 56 requests a desired password, and window 27 request the client's email address. After inputting the client's desired username, password, and email address, the client will click on "Create" button 58 to create an account. Master server 14 may request additional new account information. For example, the methods may be offered as a subscription-based service, and master server 14 may request valid payment information in order to create a new account.

FIG. 6 is a screenshot of an exemplary graphical user interface requesting a client to provide vehicle identification information. Window 60 requests the client to provide the Vehicle Identification Number (YIN). After inputting the VIN, the client clicks on the "Submit" button 65 to proceed to a graphical user interface for selecting a damaged vehicle part, as shown in FIG. 7.

FIG. 7 is a screenshot of an exemplary graphical user interface requesting a client to select a damaged major vehicle part. Toggle window 70 allows the client to select a major damaged vehicle part. The listing of the major vehicle parts under toggle window 70 is customizable. As shown in toggle window 70, some examples of major damaged vehicle parts are left front door skin, left rear door, left quarter panel, and rear bumper body floor. After selecting the major vehicle part damaged, the client clicks on the "Go" button to proceed to a graphical user interface showing a vehicle repair estimate report based on predictive estimating, as shown in FIGS. 5-8.

FIG. 8 is a screenshot of an exemplary graphical user interface showing a portion of a vehicle repair estimate report based on predictive estimating. In particular, FIG. 8 shows vehicle identification and technical specification information. Table 80 shows basic vehicle information such as the year, make, model, color, body style, engine, production date, condition, VIN, license, state, job number, mileage in, mileage out, and vehicle out. Table 81 provides further technical specifications of the vehicle, such as the vehicle's transmission, power, décor, convenience, radio, safety, seats, wheels, paint, and other.

FIG. 9 is a screenshot of an exemplary graphical user interface further showing a portion of the vehicle repair estimate report based on predictive estimating shown in FIG. 8. In particular, FIG. 9 shows various repair packages, the suggested replacement parts, the part numbers for the suggested replacement parts, the price estimate for the suggested replacement parts, among other information. Toggle window 90 allows the client to select a different or an additional major damaged vehicle part. Upon selection of a different or an additional major damaged vehicle part in toggle window, the client will click on "Go" button 91. Item 92 provides the line item number. Each line item number corresponds to a different vehicle part. Item 93 provides the operation code. Each operation is tied to a specific operation code. Every part is associated with an operation code. However, one operation code may comprise of many parts. Operation codes are customizable. Item 95 provides the part number. Item 96 provides the suggested quantity of a specific part. Item 97 provides the suggested/extended price of the specific part. Item 98 provides the suggested labor time for the repair associated with a specific part. Item 99 provides the paint code for the specific part. The paint code provides the suggested labor time required for painting the specific part. Some parts do not have a paint code because painting is not required for that specific part. Items 902, 903, and 904 are different repair packages. As previously discussed, specific parts are group together under a repair package based on the location and/or type of the damage. Item 902 is a rear bumper repair package. Item 903 is a rear lamps repair package. Item 904 is trunk lid repair package. Item 901 provides manufacturer-recommended repair instructions, which can be accessed by clicking on icon button 901.

FIG. 10 is a screenshot of an exemplary graphical user interface further showing a portion of the vehicle repair estimate report based on predictive estimating shown in FIGS. 9-10. In particular, FIG. 10 shows various repair packages, the suggested replacement parts, the part numbers for the suggested replacement parts, the price estimate for the suggested replacement parts, among other information. Item 100 is a table providing the estimate totals. Item 101 is the category column of the estimate totals table. Item 102 is the basis hours column of the estimate totals table. Item 103 is the rate column of the estimate totals table. Item 104 is the total cost column of the estimate totals table. Item 1001 shows the total costs for the parts. Item 1002 shows the total costs for the body labor hours. Item 1003 shows the total costs for the paint labor hours. Item 1004 shows the subtotal and item 1005 shows the grand total. Items 105, 106, 107, 108, and 109 shows different repair packages. As previously discussed, specific parts are group together under a repair package based on the location and/or type of the damage. Item 105 shows a seats and trucks repair package, item 106 shows a wheels repair package, item 107 shows an emission system repair package, item 108 shows an exhaust system repair package, and item 109 shows an electrical repair package.

Figure 11:
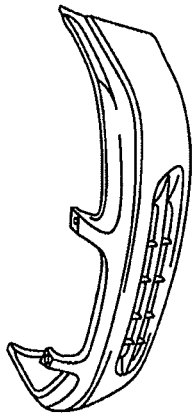
FIG. 11 is a screenshot of an exemplary graphical user interface further showing a portion of the vehicle repair estimate report based on predictive estimating shown in FIGS. 8-10 according to an embodiment of the invention.

FIG. 11 is a screenshot of an exemplary graphical user interface further showing a portion of the vehicle repair estimate report based on predictive estimating shown in FIGS. 8-10. In particular, FIG. 11 shows a collision repair instruction that is accessed directly from the vehicle repair estimate report based on predictive estimating shown in FIGS. 8-10. Icon button 111 is equivalent to icon button 901 in FIG. 9. Thus, icon button 111 provides manufacturer-recommended repair instructions, which can be accessed by clicking on icon button 111. Item 110 provides the manufacturer-recommended repair instructions associated with plastic bumper refinishing that is accessed by clicking on icon button 111.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A computing device comprising a display screen, the computing device being configured to:

receive an estimate summary report, wherein the estimate summary report is prepared by:
transmitting, using an application programming interface (API) or a SIM application toolkit (STK), from a master server to a third-party vehicle repair claims management client, one or more major vehicle parts in a first non-standardized format, manufacturer-recommended repair instructions in a second non-standardized format, and a pre-set list of secondary parts in a third non-standardized format;
converting, by the third-party vehicle repair claims management client, the one or more major vehicle parts in the first non-standardized format, the manufacturer-recommended repair instructions in the second non-standardized format and the pre-set list of secondary parts in the third non-standardized format to a standardized format for use in an estimate summary report,
wherein the converting to the standardized format comprises converting the one or more major vehicle parts, the manufacturer-recommended repair instructions, and the pre-set list of secondary parts to a format compatible with a vehicle repair claims management user interface that is associated with a third-party vehicle repair claims management entity;

display on the display screen a menu listing the one or more major vehicle parts associated with validated vehicle identification information, display on the display screen, via the vehicle repair claims management user interface, the estimate summary report directly populated from selection of a damaged major vehicle part from the one or more major vehicle parts; and provide an icon button that accesses the manufacturer-recommended repair instructions from the estimate summary report and merges the manufacturer-recommended repair instructions with the estimate summary report on the display screen, wherein the estimate summary report displays the pre-set list of secondary parts associated with the damaged major vehicle part, wherein the secondary parts are pre-determined by predictive estimating as likely being damaged prior to a major vehicle part being damaged and include additional one-time use parts that a vehicle manufacturer pre-determines, prior to the major vehicle part being damaged, are likely damaged or need to be replaced even without damage, the likely damage to the secondary part is pre-determined prior to the major vehicle part being damaged and based on the manufacturer of the damaged major vehicle part and of the secondary part recommending replacing the secondary part based on the damaged major vehicle part, the likely damage to the secondary part being due to an outside impact by another object to the major vehicle part, the secondary parts being both behind the damaged major vehicle part and in radial directions away from the damaged major vehicle part, wherein each of the secondary parts in the pre-set list is selectable to launch a window and enable vehicle repair information to be seen, wherein each of the secondary parts in the pre-set list is selectable to be eliminated from the pre-set list due to being determined as unnecessary by a vehicle repair estimator, wherein each of the secondary parts in the pre-set list includes an indication if the secondary part is a hazardous materials part, wherein the estimate summary report is displayed along with respective prices of the secondary parts, wherein the prices of the secondary parts are in an automatically summed state as an estimate total, and wherein the secondary parts are grouped into repair packages based on a type of damage, a location of the damaged major vehicle part and a location of the secondary parts that are likely damaged.

2. The computing device of claim 1, wherein the vehicle repair information includes the manufacturer-recommended repair instructions, manufacturer-recommended parts to be replaced, an identification of the one-time use parts, part numbers for the manufacturer-recommended parts to be replaced, and a price estimate for the manufacturer-recommended parts to be replaced.

3. The computing device of claim 1, further comprising displaying a button providing functionality to remove each of the secondary parts in the pre-set list from the estimate summary report and dynamically updating the estimate summary report.

4. The computing device of claim 1, wherein the computing device is configured to display a purchase function to purchase any part from the pre-set list of secondary parts.

5. The computing device of claim 1, wherein the vehicle repair information further includes the hazardous materials parts, operation codes, paint codes, and manufacturer-recommended installation instructions.

6. The computing device of claim 1, wherein the vehicle repair information includes directions for a vehicle repair professional performing a repair on a vehicle.

7. The computing device of claim 1, further comprising improving accuracy of vehicle repair estimates by providing a comprehensive pre-set listing of secondary parts that could be replaced when the damaged major vehicle part is replaced.

8. The computing device of claim 1, wherein the pre-set list of secondary parts is provided on a graphical user interface displayed by the display screen, the graphical user interface having one or more groupings of the secondary parts in the repair packages.

9. The computing device of claim 8, wherein the graphical user interface further includes a dynamically selectable icon configured to launch the window and enable the vehicle repair information to be displayed.

10. The computing device of claim 8, wherein the window having the vehicle repair information covers a portion of the pre-set list of secondary parts on the graphical user interface.

11. The computing device of claim 8, wherein the graphical user interface includes a selectable list of major vehicle parts, and wherein selection of an additional major vehicle part from the selectable list of major vehicle parts causes display of a second pre-set list of secondary parts associated with the additional major vehicle part to be added to the estimate summary report.

12. The computing device of claim 1, wherein the computing device is further configured to display a repair package with the damaged major vehicle part, the secondary parts and the vehicle repair information.

13. A system comprising:
a computing device comprising a display screen, the computing device being configured to:
receive an estimate summary report,
wherein the estimate summary report is prepared by:
transmitting, using an application programming interface (API) or a SIM application toolkit (STK), from a master server to a third-party vehicle repair claims management client, one or more major vehicle parts in a first non-standardized format, manufacturer-recommended repair instructions in a second non-standardized format, and a pre-set list of secondary parts in a third non-standardized format;
converting, by the third-party vehicle repair claims management client, the one or more major vehicle parts in the first non-standardized format, the manufacturer-recommended repair instructions in the second non-standardized format and the pre-set list of secondary parts in the third non-standardized format to a standardized format for use in an estimate summary report,
wherein the converting to the standardized format comprises converting the one or more major vehicle parts, the manufacturer-recommended repair instructions, and the pre-set list of secondary parts to a format compatible with a vehicle repair claims management user interface that is associated with a third-party vehicle repair claims management entity;
display on the display screen a menu listing the one or more major vehicle parts associated with validated vehicle identification information,
display on the display screen, via the vehicle repair claims management user interface, the estimate summary report directly populated from selection of a damaged major vehicle part from the one or more major vehicle parts; and
provide an icon button that accesses the manufacturer-recommended repair instructions from the estimate summary report and merges the manufacturer-recommended repair instructions with the estimate summary report on the display screen,
wherein the estimate summary report displays the pre-set list of secondary parts associated with the damaged major vehicle part,
wherein the secondary parts are pre-determined by predictive estimating as likely being damaged prior to the major vehicle part being damaged and include additional one-time use parts that a vehicle manufacturer pre-determines, prior to the major vehicle part being damaged, are likely damaged or need to be replaced even without damage,
the likely damage to the secondary part is pre-determined prior to a major vehicle part being damaged and based on the manufacturer of the damaged major vehicle part and of the secondary part recommending replacing the secondary part based on the damaged major vehicle part,
the likely damage to the secondary part being due to an outside impact by another object to the major vehicle part,
the secondary parts being both behind the damaged major vehicle part and in radial directions away from the damaged major vehicle part,
wherein each of the secondary parts in the pre-set list is selectable to launch a window and enable vehicle repair information to be seen,
wherein each of the secondary parts in the pre-set list is selectable to be eliminated from the pre-set list due to being determined as unnecessary by a vehicle repair estimator,
wherein each of the secondary parts in the pre-set list includes an indication if the secondary part is a hazardous part,
wherein the estimate summary report is displayed along with respective prices of the secondary parts, wherein the prices of the secondary parts are in an automatically summed state as an estimate total, and
wherein the secondary parts are grouped into repair packages based on a type of damage, a location of the damaged major vehicle part and a location of the secondary parts that are likely damaged; and
a server configured to provide, via the vehicle repair claims management user interface, to the computing device via a communication network, the one or more major vehicle parts, the pre-set list of secondary parts associated with the damaged major vehicle part, and the vehicle repair information.

14. The system of claim 13, wherein the vehicle repair information includes the manufacturer-recommended repair instructions, manufacturer-recommended parts to be replaced, an identification of the one-time use parts, part numbers for the manufacturer-recommended parts to be replaced, and a price estimate for the manufacturer-recommended parts to be replaced.

15. The system of claim 13, further comprising displaying a button providing functionality to remove each of the secondary parts in the pre-set list from the estimate summary report and dynamically updating the estimate summary report.

16. The system of claim 13, wherein the pre-set list of secondary parts includes an indication of whether a particular secondary part is a one-time use part.

17. The system of claim 13, wherein the pre-set list of secondary parts improves accuracy of vehicle repair estimates by providing a comprehensive pre-set listing of secondary parts that could be replaced when the damaged major vehicle part is replaced.

18. The system of claim 13, wherein the pre-set list of secondary parts is provided on a graphical user interface displayed by the display screen of the computing device, the graphical user interface having one or more groupings of the secondary parts in the repair packages.

19. The system of claim 18, wherein the graphical user interface further includes a dynamically selectable icon configured to launch the window and enable the vehicle repair information to be displayed.

20. The system of claim 18, wherein the graphical user interface includes a selectable list of major vehicle parts, and
wherein selection of an additional major vehicle part from the selectable list of major vehicle parts causes display of a second pre-set list of secondary parts associated with the additional major vehicle part to be added to the estimate summary report.

* * * * *